United States Patent
Gutmann

(10) Patent No.: US 12,270,511 B2
(45) Date of Patent: Apr. 8, 2025

(54) METHOD FOR PRODUCING A FUEL RAIL FOR A PRESSURE VESSEL SYSTEM, FUEL RAIL, PRESSURE VESSEL SYSTEM, AND MOTOR VEHICLE

(71) Applicant: Bayerische Motoren Werke Aktiengesellschaft, Munich (DE)

(72) Inventor: Timo Gutmann, Bad Kohlgrub (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 92 days.

(21) Appl. No.: 18/034,584

(22) PCT Filed: Oct. 5, 2021

(86) PCT No.: PCT/EP2021/077346
§ 371 (c)(1),
(2) Date: Apr. 28, 2023

(87) PCT Pub. No.: WO2022/089883
PCT Pub. Date: May 5, 2022

(65) Prior Publication Data
US 2023/0408040 A1    Dec. 21, 2023

(30) Foreign Application Priority Data
Oct. 30, 2020    (DE) ............... 10 2020 128 607.4

(51) Int. Cl.
*F17C 13/08*    (2006.01)
(52) U.S. Cl.
CPC .... *F17C 13/084* (2013.01); *F17C 2205/0134* (2013.01); *F17C 2205/0323* (2013.01); *F17C 2205/0352* (2013.01)

(58) Field of Classification Search
CPC ............ F17C 13/084; F17C 2205/0134; F17C 2205/0138; F17C 2205/0142; F02M 55/025
See application file for complete search history.

(56) References Cited

U.S. PATENT DOCUMENTS

| | | |
|---|---|---|
| 4,832,376 A | 5/1989 | Sugao |
| 2003/0146214 A1 | 8/2003 | Idoguchi |
| 2003/0178423 A1 | 9/2003 | Sugiyama et al. |
| 2011/0094477 A1 | 4/2011 | Mehring et al. |
| (Continued) | | |

FOREIGN PATENT DOCUMENTS

| | | |
|---|---|---|
| DE | 102 47 524 B4 | 8/2004 |
| DE | 602 06 264 T2 | 4/2006 |
| (Continued) | | |

OTHER PUBLICATIONS

International Search Report (PCT/ISA/210) issued in PCT Application No. PCT/EP2021/077346 dated Mar. 21, 2022 with English translation (nine (9) pages).

(Continued)

*Primary Examiner* — Kenneth Rinehart
*Assistant Examiner* — Nicole Gardner
(74) *Attorney, Agent, or Firm* — Crowell & Moring LLP

(57) ABSTRACT

A fuel rail and a method for producing the fuel rail for a pressure vessel system are provided. The method provides a fuel line and configures a plurality of rail connectors. The rail connectors have a cross-sectional area that is enlarged in comparison to the provided fuel line, and the rail connectors are configured so as to be integral to the fuel line.

19 Claims, 14 Drawing Sheets

(56) References Cited

U.S. PATENT DOCUMENTS

| | | | |
|---|---|---|---|
| 2014/0130896 A1 | 5/2014 | Mayr | |
| 2015/0136084 A1 | 5/2015 | Maier et al. | |
| 2020/0272829 A1 | 8/2020 | Hamagami et al. | |
| 2020/0291911 A1 | 9/2020 | Millet et al. | |

FOREIGN PATENT DOCUMENTS

| | | |
|---|---|---|
| DE | 10 2017 205 691 A1 | 10/2018 |
| DE | 10 2019 202 895 A1 | 9/2020 |
| EP | 2 650 585 A1 | 10/2013 |
| EP | 3 604 787 A1 | 2/2020 |
| EP | 3 204 683 B1 | 9/2020 |
| JP | 2020-135761 A | 8/2020 |

OTHER PUBLICATIONS

German-language Written Opinion (PCT/ISA/237) issued in PCT Application No. PCT/EP2021/077346 dated Mar. 21, 2022 (nine (9) pages).

German-language Search Report issued in German Application No. 10 2020 128 607.4 dated Jun. 24, 2021 with partial English translation (11 pages).

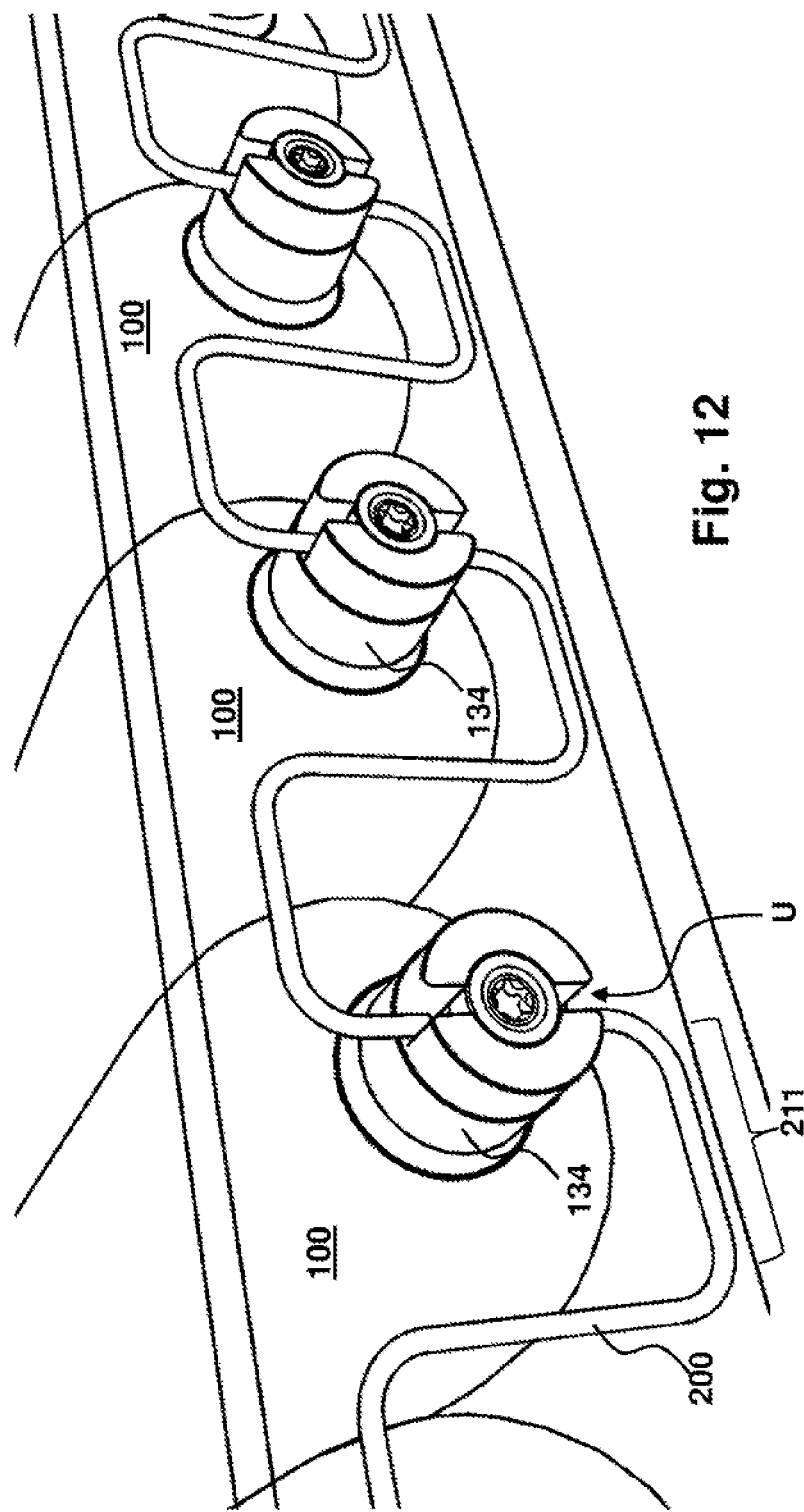

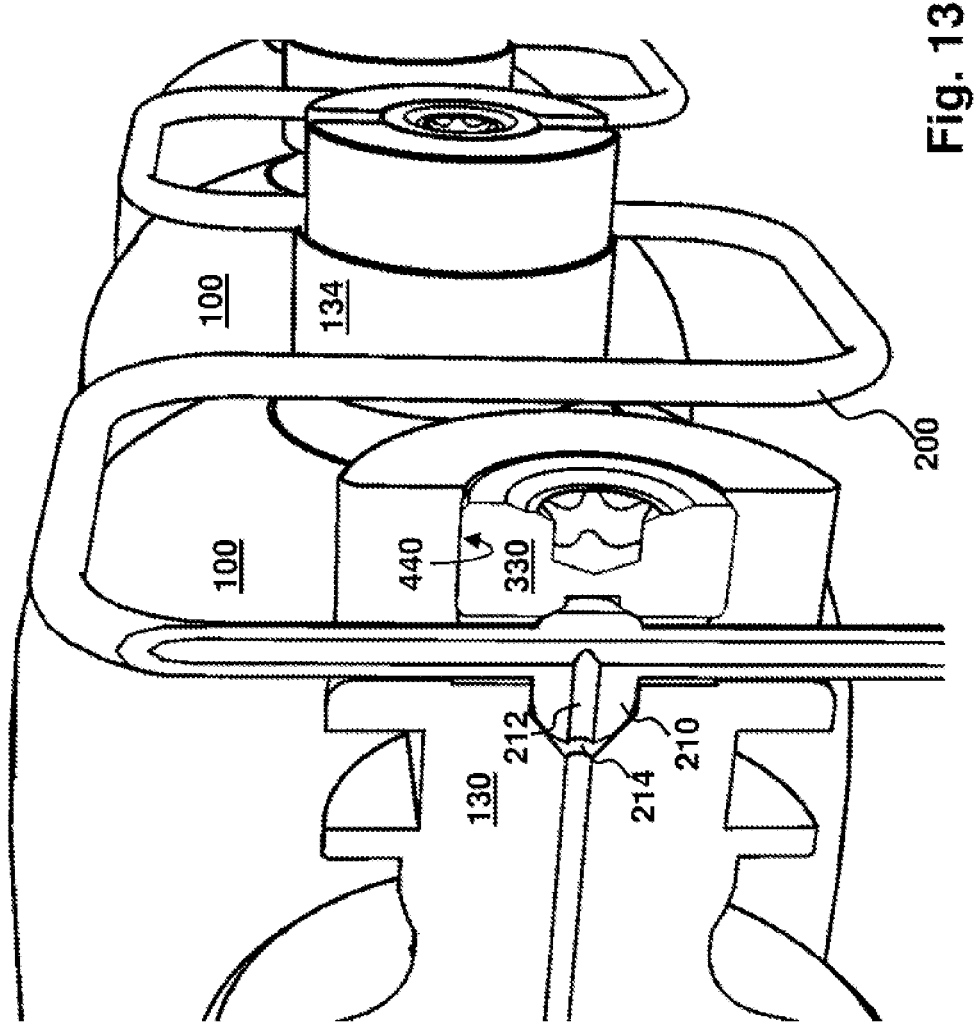

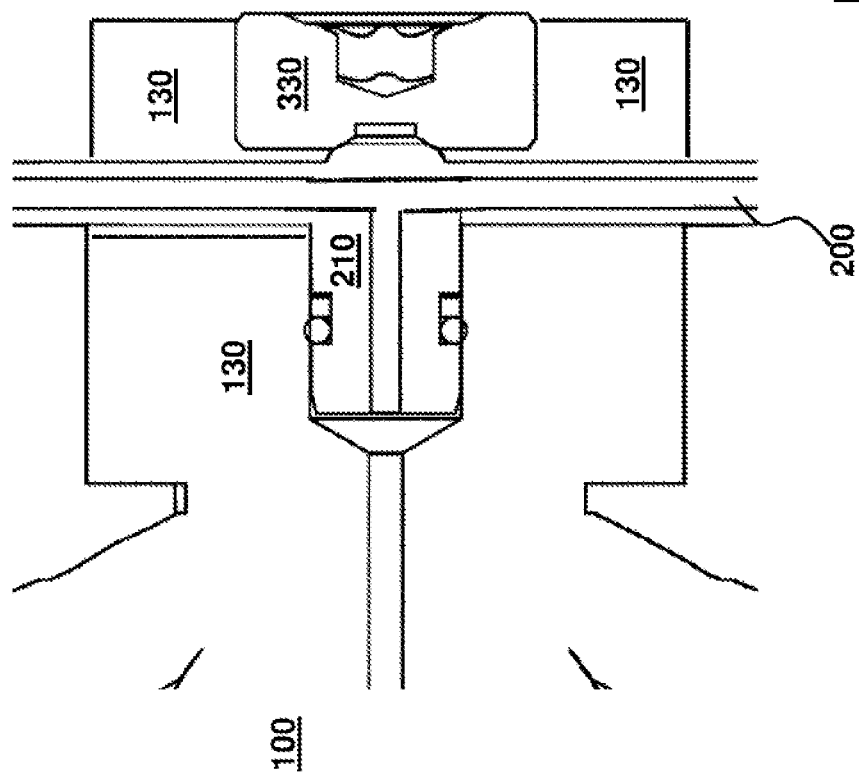

METHOD FOR PRODUCING A FUEL RAIL FOR A PRESSURE VESSEL SYSTEM, FUEL RAIL, PRESSURE VESSEL SYSTEM, AND MOTOR VEHICLE

BACKGROUND AND SUMMARY

Motor vehicles having pressure vessels are known from the prior art. Up to three large pressure vessels per motor vehicle are typically provided. Owing to their dimensions, such pressure vessels are comparatively difficult to integrate in a motor vehicle.

Furthermore, there are vehicle concepts in which significantly more pressure vessels are integrated in the motor vehicle, each individual pressure vessel being configured so as to be substantially tubular. Pressure vessel systems having a plurality of storage tubes can be better integrated in the available installation space. It is disadvantageous that such pressure vessel systems are comparatively complex and expensive because they have to meet the same requirements in terms of range and component safety as conventional pressure vessel systems. Furthermore, the probability of leakages increases along with the comparatively large number of interfaces.

It is a preferred object of the technology disclosed herein to minimize or eliminate at least one disadvantage of a previously known solution, or to propose an alternative solution. It is in particular a preferred object of the technology disclosed herein to propose a comparatively simple, inexpensive, safe, lightweight and/or installation space optimized pressure vessel system. Further preferred objects may be derived from the advantageous effects of the technology disclosed herein. The object(s) is/are achieved by the subject matter of the independent patent claims. The dependent claims represent preferred design embodiments.

The technology disclosed herein relates to a pressure vessel system for a motor vehicle (e.g. automobiles, motorcycles, commercial vehicles). The pressure vessel system comprises at least one pressure vessel, and preferably a plurality of pressure vessels, for storing fuel. The pressure vessel system serves for storing fuel that is gaseous under ambient conditions. The pressure vessel system can be used, for example, in a motor vehicle which is operated using compressed natural gas (also referred to as CNG) or liquefied natural gas (also referred to as LNG) or using hydrogen. The pressure vessel system is fluidically connected to at least one energy converter which is specified to convert the chemical energy of the fuel into other forms of energy, for example a fuel cell or an internal combustion engine.

The pressure vessel can be a high-pressure gas vessel, for example. High-pressure gas vessels are configured to permanently store fuel at a nominal operating pressure (also referred to as nominal working pressure or NWP) of at least 350 bar over atmospheric pressure or at least 700 bar over atmospheric pressure at ambient temperatures. The pressure vessels can have circular or oval cross sections. For example, a plurality of pressure vessels of which the longitudinal axes in the installed position run mutually parallel can be provided. The individual pressure vessels can in each case have a length-to-diameter ratio with a value between 4 and 200, preferably between 5 and 100, and particularly preferably between 6 and 50. The length-to-diameter ratio is the quotient resulting from the overall length of the individual pressure vessels (e.g. overall length of a storage tube without fluidic connection elements) in the numerator and the largest external diameter of the pressure vessel in the denominator. The individual pressure vessels can be disposed directly adjacent to one another, for example at a mutual spacing of less than 20 cm, or less than 15 cm, or less than 10 cm, or less than 5 cm. The plurality of pressure vessels can in each case be mechanically coupled to one another at one end or at both ends. It can furthermore advantageously be provided that common bodywork attachment elements for the plurality of pressure vessels are in each case provided on both ends, the pressure vessels being able to be fastened in the motor vehicle by means of the bodywork attachment elements. Such a system is particularly suitable for flat installation spaces, in particular in the underfloor region below the vehicle interior. In one preferred design embodiment, the plurality of pressure vessels conjointly with the bodywork attachment element(s) form a pressure vessel module. The pressure vessel module can expediently be received in a housing. Such a pressure vessel module (optionally with a housing) is typically integrated in the motor vehicle as one component.

The pressure vessel comprises a connector piece. The connector piece forms the pressure vessel opening of the pressure vessel. The connector piece is typically provided at one end of the pressure vessel. The connector piece is preferably produced from metal and is often also referred to as a "boss". The connector piece is expediently provided so as to be coaxial with the pressure vessel longitudinal axis. The connector piece serves for configuring a fluidic connection between the fuel storage volume of the pressure vessel and the energy converter of the motor vehicle. One part of the connector piece leads out of the pressure vessel. Another part can be integrated in the vessel wall. In other words, the connector piece can be configured so as to be integral to the pressure vessel, or be embedded in the latter, respectively. However, it is also contemplated that the connector piece is attached to the pressure vessel exterior. For example, the connector piece can have a portion that protrudes into the vessel wall and is surrounded by a fiber-reinforced layer. Such a fiber-reinforced layer can also be referred to as armor and is typically applied by braiding and/or wrapping. The connector piece preferably comprises an end side which typically runs so as to be substantially parallel to a plane that is aligned so as to be perpendicular to the pressure vessel longitudinal axis. The connector piece expediently does not comprise a separate tank shut-off valve, but is connected to the common valve unit disclosed herein by way of the fuel-conducting portion. In one design embodiment, a pipe rupture safety valve can in each case be provided in the fuel storage volume or in the connector piece of the at least one pressure vessel, the pipe rupture safety valve in the event of a failure precluding the outflow of fuel from the pressure vessel. Such a pipe rupture safety valve prevents the uncontrolled release of the fuel in the event of a line rupture in the downstream line system of the fuel supply installation and can automatically be reset once the error has been addressed.

That part of the external surface of the connector piece that leads out of the pressure vessel comprises a sealing face and a curved fastening face. The sealing face can be configured as a truncated cone face or a funnel-shaped face that tapers into the connector piece. The sealing face, in the installed position of the pressure vessel, is specified to seal the fluidic connection between the pressure vessel and a fuel-conducting portion of the motor vehicle, in particular the fuel rail disclosed herein. To this end, an external surface of the fuel-conducting portion can contact the sealing face of the connector piece directly or by way of a sealing element disposed therebetween. The external surface of the fuel-conducting portion is preferably a curved external surface, particularly preferably in the shape of a spherical segment, which at least in regions contacts the sealing face. In this way, if the external surface in the shape of a spherical segment of the fuel-conducting portion and the truncated cone-shaped sealing face are brought to contact one another, a positive seal seat can be generated. Furthermore, the pressure vessel can therefore also be aligned using simple means. The curved fastening face can be formed by a surface portion of a spherical segment or of a cylinder. The fastening face is provided for fastening the pressure vessel directly to at least one bodywork attachment element.

A recess which is depressed in relation to an end face of the connector piece can be provided in the connector piece. The recess can be specified to at least partially, and preferably entirely, receive a portion of the fuel line and in particular the rail connector. The recess in the cross section along the pressure vessel longitudinal axis is expediently configured so as to be C-shaped or U-shaped. The recess typically subdivides the end face of the connector piece into two circular segments or annular segments. These segments are opposite one another.

In one preferred design embodiment the connector piece comprises a (preferably divided) internal thread, a (preferably divided) external thread of the contact pressure plate engaging in the latter in order for the rail connector to be braced. In other words, the protrusions that configure the segments of the end face expediently have an internal side. This internal side in the assembled state faces that portion of the fuel line, or of the rail connector, that is received in the recess. An internal thread is advantageously provided on this internal side.

The at least one bodywork attachment element serves for fastening the pressure vessel directly or indirectly to the bodywork of the motor vehicle and can have any suitable design. The connector piece, and/or the bodywork attachment element, at the respective end where the connector piece is provided is/are configured for transmitting the forces and moments resulting from the pressure vessel during the operation of the motor vehicle to the bodywork of the motor vehicle. The bodywork attachment element can have a curved internal surface, preferably an internal surface in the shape of a spherical segment, the curvature of the latter for configuring a contact face corresponding substantially to the curvature of the external surface of the fastening face. It is also contemplated that a clamping piece is provided for attaching to the bodywork. In this way, an ideally large contact face for reliably transmitting the mechanical load can be implemented. In one design embodiment, the bodywork attachment element can be a member to which a plurality of pressure vessels are fastened. The member in turn can be attached to the bodywork of the motor vehicle by way of bodywork attachment points. For example, the bodywork attachment element can be a longitudinal member or a crossmember.

The fastening face and the sealing face are expediently provided laterally on that part of the connector piece that leads out of the pressure vessel. The connector piece can expediently comprise an end side which is disposed in a plane that runs so as to be substantially perpendicular to the pressure vessel longitudinal axis. That part of the connector piece that leads out of the pressure vessel can furthermore comprise circumferential faces on which the (lateral) external faces are provided, wherein the fastening face and the sealing face can be provided on these circumferential faces. In one design embodiment, the circumferential faces can expediently run so as to be orthogonal to the end side. The fastening face and the sealing face can be disposed so as to be mutually opposite in such a manner that the fastening face and the sealing face in the installed position are able to be braced in relation to one another by the same at least one tensioning means (e.g. screws). In a further design embodiment, it can be provided that the fastening face is provided laterally on that part of the connector piece that leads out of the pressure vessel, and that the sealing face is provided in the end side of that part of the connector piece that leads out. The bodywork attachment can thus advantageously be separated from the fluidic attachment. This can be a more robust design embodiment and be advantageous in terms of the basic design and/or the assembly of such a system. The design embodiment of the connector piece disclosed herein is particularly advantageous and can be combined with conventional fuel-conducting portions or with the fuel rail disclosed herein.

The fuel-conducting portion and/or the bodywork attachment element for configuring a bearing point can preferably jam that part of the connector piece that leads out. The connector piece, and in particular the fastening face, thus serve for mounting the pressure vessel in the motor vehicle. Such a mounting by way of the end of the pressure vessel is also referred to as a "neck mount".

The pressure vessel system, or the pressure vessel, can be specified such that the fuel at the end of the pressure vessel can flow in or out by way of a fluid duct that runs laterally, and in particular perpendicularly, to the pressure vessel longitudinal axis. In an alternative design embodiment, the pressure vessel system, or the pressure vessel, can be configured in such a manner that the fuel can flow in or out by way of a fluid duct that runs parallel to the pressure vessel longitudinal axis. It is particularly preferably provided that no (tank shut-off) valve which (conjointly) forms the fluid duct is screwed into the connector piece.

The fuel-conducting portion serves for filling the pressure vessel with fuel and/or for retrieving fuel from the pressure vessels. The pressure in the fuel-conducting portion preferably corresponds substantially to the internal pressure of the pressure vessels. The individual pressure vessels are typically disposed in parallel. The plurality of pressure vessels are fluidically connected among one another or to one another without interruption. "Without interruption" in this context means that no valve which would interrupt this fluidic connection during the flawless operation is provided between the individual pressure vessels. Consequently, the fuel pressure in the various pressure vessels typically has substantially the same value.

If the pressure vessel system comprises a plurality of pressure vessels, the at least one fuel-conducting portion disclosed herein can preferably be configured as a fuel rail. The fuel rail can also be referred to as a high-pressure fuel rail. The latter is typically provided upstream of the (high-pressure) pressure regulator. In principle, such a fuel rail can be of a similar design to a high-pressure injection rail of an internal combustion engine. The fuel rail expediently comprises a plurality of rail connectors for directly connecting the pressure vessels. The individual rail connectors are advantageously provided directly on the rail housing and/or all have the same spacing among one another. The fuel rail is expediently configured to withstand substantially the same pressures as the pressure vessel/pressure vessels which is/are connected to the fuel rail.

The fuel rail can be configured so as to be substantially flexurally rigid. Flexurally rigid in this context means that the fuel rail is rigid in terms of bending, or that in the use of the fuel rail according to the intended function only bending arises that is imperceptible and unremarkable in terms of the function. In an alternative design embodiment, the fuel rail can be configured in such a manner that the fuel rail can compensate variations in the position of the pressure vessels, and in particular of the connector pieces of the latter. Variations in position are deviations between an actual position of the pressure vessels (in operation, during production, during servicing, or another situation) and a target position assumed during construction. Positional variations are the result of, for example, the expansion of the components (e.g. of the pressure vessels) by virtue of changes in the internal pressure and/or changes in temperature. Furthermore, positional variations (positional deviations) can arise owing to manufacturing tolerances. The fuel rail can be specified to enable a compensation of tolerances perpendicular to the pressure vessel longitudinal axes of the pressure vessel system.

In one preferred design embodiment the fuel rail is not made from a special housing but instead is made from a fuel line, or a fuel pipe, preferably a metal pipe, and particularly preferably from a stainless steel pipe. The fuel rail advantageously comprises only one fuel line which connects a plurality of rail connectors (e.g. at least 3 or at least 5 rail connectors) to one another, without further sealing points between the rail connectors being provided. The fuel line preferably has a wall thickness of 0.75 mm to 5 mm, or of 1 mm to 3.5 mm, or of 1.5 mm to 2 mm. The fuel line preferably has an external diameter of 4 mm to 15 mm, or of 5 mm to 12 mm, or of 6 mm to 10 mm. The fuel line is preferably configured so as to be circular. It is likewise contemplated that the fuel line has a polygonal cross-sectional geometry. In this case, in polygons having an even number of corners (e.g. rectangles), the external diameter corresponds to the maximum external spacing of mutually opposite faces. In an equilateral polygon having an odd number of corners (e.g. pentagon), the external diameter corresponds to the diameter of a circle which is defined by the outer corners of the polygon. In an oval cross-sectional geometry, the external diameter corresponds to the maximum external diameter.

A fuel rail can be produced in a particularly inexpensive and fail-safe manner using a fuel line.

The rail connectors of the fuel rail, in the regions of the rail connectors, have in each case a cross-sectional area perpendicular to the longitudinal axis of the fuel line that is enlarged in comparison to those regions of the fuel line that are provided directly adjacent to the rail connectors. The rail connectors are advantageously configured so as to be in one piece with the fuel line, or so as to be integral to the latter. The rail connectors are expediently produced from the same material as the fuel line. Integral in this context means that the rail connectors cannot be released in a destruction-free manner from the fuel line, or are formed by the fuel line per se, optionally by applying additional material. If further components conjointly form the rail connectors, these further components are connected in a materially integral manner to the fuel line. In other words, the rail connectors are typically thickened regions of the fuel line that are produced by, for example, forming, by an application of material and/or by a subtraction of material, wherein the fuel line per se is also present in the thickened region per se. The fuel rail can in particular be produced from a high-pressure line. At least one rail connector of the rail connectors is expediently embodied so as to be spaced apart from the ends of the fuel line. The rail connectors are thus not in each case provided at one end of the fuel line but somewhere between the ends of the fuel line. The rail connectors are in each case often mutually spaced apart at identical spacings. A rail connector connection hole is typically provided in the at least one rail connector. The rail connector connection hole is a through hole that establishes the fluidic connection between the pressure vessel and the fluid duct in the interior of the fuel line. The through hole can advantageously be a bore, i.e. be configured by boring. The rail connector connection hole in most instances runs at an angle, and preferably perpendicularly, to the longitudinal axis of the fuel line, or of the fluid duct configured in the fuel line.

The fuel rail can comprise bent sub-regions. The bent sub-regions can in particular be configured by bending the fuel line. Potential stresses which are incorporated into the fuel rail as a result of the bending can advantageously be at least minimized by a thermal treatment. The bent sub-regions are in each case expediently provided between two rail connectors. The bent sub-regions in the installed position thereof are specified to compensate potential variations in the position of the pressure vessels, e.g. in a direction perpendicular to the pressure vessel longitudinal axes of the pressure vessels disposed substantially in parallel and/or deviations in the angle of the pressure vessels in relation to one another. Furthermore, thermal stresses as a result of dissimilar thermal expansions can be compensated. To this end, those sub-regions of the fuel rail that are formed by the bent fuel rail can be deformed in a substantially elastic manner. The shape, or the profile, of the fuel line in the bent sub-region is designed precisely for this purpose. The plurality of rail connectors preferably lie on a common axis, whereas the bent sub-regions at least partially run so as to be spaced apart from this common axis. For example, the spacing from the common axis can be at least 4 cm, or at least 6 cm, or at least 8 cm. Advantageously proposed is a fuel rail, the length of the latter between two rail connectors being larger than the direct spacing between the sealing faces of two adjacent pressure vessels, potential tolerances being better able to be compensated in this way. The fuel rail, and in particular the bent sub-regions, at least in regions can be configured in a meandering or zigzag shape. At least one portion advantageously runs at an angle, and particularly preferably perpendicularly, to the common axis, wherein the portion is at least 4 cm, or at least 6 cm, or at least 8 cm in length. The bent sub-regions in the installed position can at least partially protrude into an intermediate region between two directly adjacent pressure vessels. Such intermediate regions are created in particular in the tapered dome regions of the pressure vessels. This enables a particularly space-saving disposal of the fuel rail.

The at least one fuel rail and the at least one bodywork attachment element can in each case clamp in a plurality of pressure vessels. In this way, a particularly simple, space-saving and inexpensive pressure vessel system which is able to be assembled in an easy, reliable and rapid manner can advantageously be achieved.

According to the technology disclosed herein, at least one thermally activatable pressure relief installation can be connected directly, without any further line portions, to the at least one fuel rail disclosed herein. Alternatively or additionally, at least one thermally activatable pressure relief installation can be provided on the at least one pressure vessel and preferably on each of the pressure vessels, preferably on that/those end(s) which are distal in terms of the fuel-conducting portion, or on the proximal end(s), or on both ends. For example, the thermally activatable pressure relief installations can be provided in the connector pieces and/or corresponding end pieces on the ends that face away from the pressure vessels. The thermally activatable pressure relief installation, also referred to as the thermal pressure relief device (TPRD) or thermal safety device, is typically provided so as to be adjacent to the pressure vessel. Under the effect of heat (e.g. as a result of flames) the fuel which is stored in the pressure vessel is discharged into the environment by the TPRD. The pressure relief installation discharges the fuel as soon as the trigger temperature of the TPRD is exceeded (i.e. is thermally activated). Trigger lines can furthermore be provided. Such a thermal pressure relief system is disclosed in the German patent application published under DE 10 2015 222 252 A1, for example.

At least one valve unit can be connected directly and without further line portions to the fuel rail, the valve unit comprising at least one normally closed valve. During the operation of the motor vehicle according to the intended function, the plurality of pressure vessels are particularly preferably fluidically connected to the valve without interruption. The valve is the valve of which the input pressure corresponds (substantially) to the pressure of the plurality of pressure vessels. The valve is in particular a valve that can be feedback-controlled, or controlled, respectively. In the Directive (EU) No. 406/2010 of the Commission for Implementing the Directive (EC) No. 79/2009 of the European Parliament and of the Council for Type Approval of Hydrogen-operated Motor Vehicles dated Apr. 26, 2010, such a tank shut-off valve is also referred to as the first valve. The valve in the normal operation serves inter alia for interrupting the fluidic connection between the individual pressure vessels and the downstream components of the fuel supply installation, for example when the motor vehicle assumes a parked state, and/or when a malfunction has been detected and the fluidic connection is to be interrupted for safety reasons. No normally closed valves are typically provided between the fuel storage volume of the pressure vessels and the rail connectors.

The technology disclosed herein furthermore relates to a motor vehicle having the pressure vessel system disclosed herein, or the pressure vessel disclosed herein. An underfloor region of the motor vehicle by at least one member can be subdivided into different underfloor installation regions. Such members can be provided in order to transmit the loads introduced into the motor vehicle during a side impact to the opposite rocker panel. A fuel rail can be provided on or in a plurality or all of the underfloor installation regions, the pressure vessels disposed in the respective underfloor installation region being connected to the fuel rail. In one design embodiment it can be provided that, depending on the customer requirement, the individual underfloor installation regions are equipped with high-voltage batteries or with pressure vessel systems.

The technology disclosed herein furthermore comprises a method for producing a fuel rail for a pressure vessel system having a plurality of pressure vessels for storing fuel, in particular for producing the fuel rail disclosed herein and/or for the pressure vessel system disclosed herein. The method comprises the following steps:

providing a (preferably straight) fuel line;
configuring a plurality of rail connectors, wherein the rail connectors have a cross-sectional area perpendicular to the axis A-A of the fuel line that is enlarged in comparison to the provided fuel line, and wherein the rail connectors are configured so as to be integral to the fuel line and so as not to be able to be released in a non-destructive manner from the latter.

The method can comprise the step according to which rail connector connection holes are provided in the configured rail connectors. This can take place before or after configuring the bent sub-regions. The rail connector connection holes can be, for example, bores which are advantageously incorporated before or after configuring the bent sub-regions.

The method can comprise the step according to which bent sub-regions, in particular the bent sub-regions disclosed herein, are provided in the fuel line.

The method can comprise the step according to which the plurality of rail connectors are configured by a forming method, in particular by rotary swaging. Rotary swaging, or net shape forming, is a stepwise pressure forming method in which the forming tools are disposed concentrically about the workpiece. The tools oscillate at a high frequency and at a small stroke. Relative rotation between the tool and the workpiece takes place in the process.

Alternatively or additionally, additive methods can be used, for example: build-up welding, recasting, overmolding. Also, the geometry of a rail connector could be configured by pushing on semi-finished products. The semi-finished products can subsequently be compressed, adhesively bonded, plastically formed, soldered/brazed or welded. For example, a fitting having the rail connector geometry could be attached, the fitting being connected to the fuel line in a materially integral manner.

Alternatively or additionally, subtractive or cutting methods can be used for configuring the rail connectors. Methods in which the aforementioned methods are combined are also conceivable. The geometry of the rail connectors does not have to be spherical, but other geometries may also be provided. A front end of the rail connector for configuring a tight fluidic connection is typically configured so as to be substantially in the shape of a spherical segment. For example, it can expediently be provided that only the front end of the rail connector is substantially in the shape of a spherical segment. For example, the rail connector can be configured so as to be cylindrical, in particular having a dome as the front end. It is likewise contemplated that at least one sealing element, e.g. an O-ring, in the assembled state is provided on the wall of the fluid duct provided in the connector piece. The sealing element can be supported on a cylindrical external wall portion of the rail connector, for example, and press against the internal wall of the fluid duct of the connector element.

In other words, the method disclosed herein for producing the fuel rail can comprise the following method steps:
1. Providing a straight fuel line; thereafter
2. Manufacturing the thickenings with a suitable geometry (e.g. by rotary swaging); thereafter
3. Incorporating connection holes in the thickening/geometry; and thereafter
4. Bending the fuel line into the desired shape.

The connection of the pressure vessels can thus be established by a fuel line which is locally spherically compressed. The sphere at one location can be provided radially with an opening. In this way, an integrally configured "mini T-fitting" is created. The location of the sphere having the bore is fastened to a suitable part of the vessel by way of a suitable clamping device.

The technology disclosed herein will now be explained by means of the figures.

BRIEF DESCRIPTION OF THE DRAWINGS

FIG. 12 shows a schematic view of a further design embodiment of the technology disclosed herein;

FIG. 13 shows a cut-away perspective view of the design embodiment according to FIG. 12; and FIG. 14 shows a sectional view through a connector piece along the pressure vessel longitudinal axis.

DETAILED DESCRIPTION OF THE DRAWINGS

Figure 1:
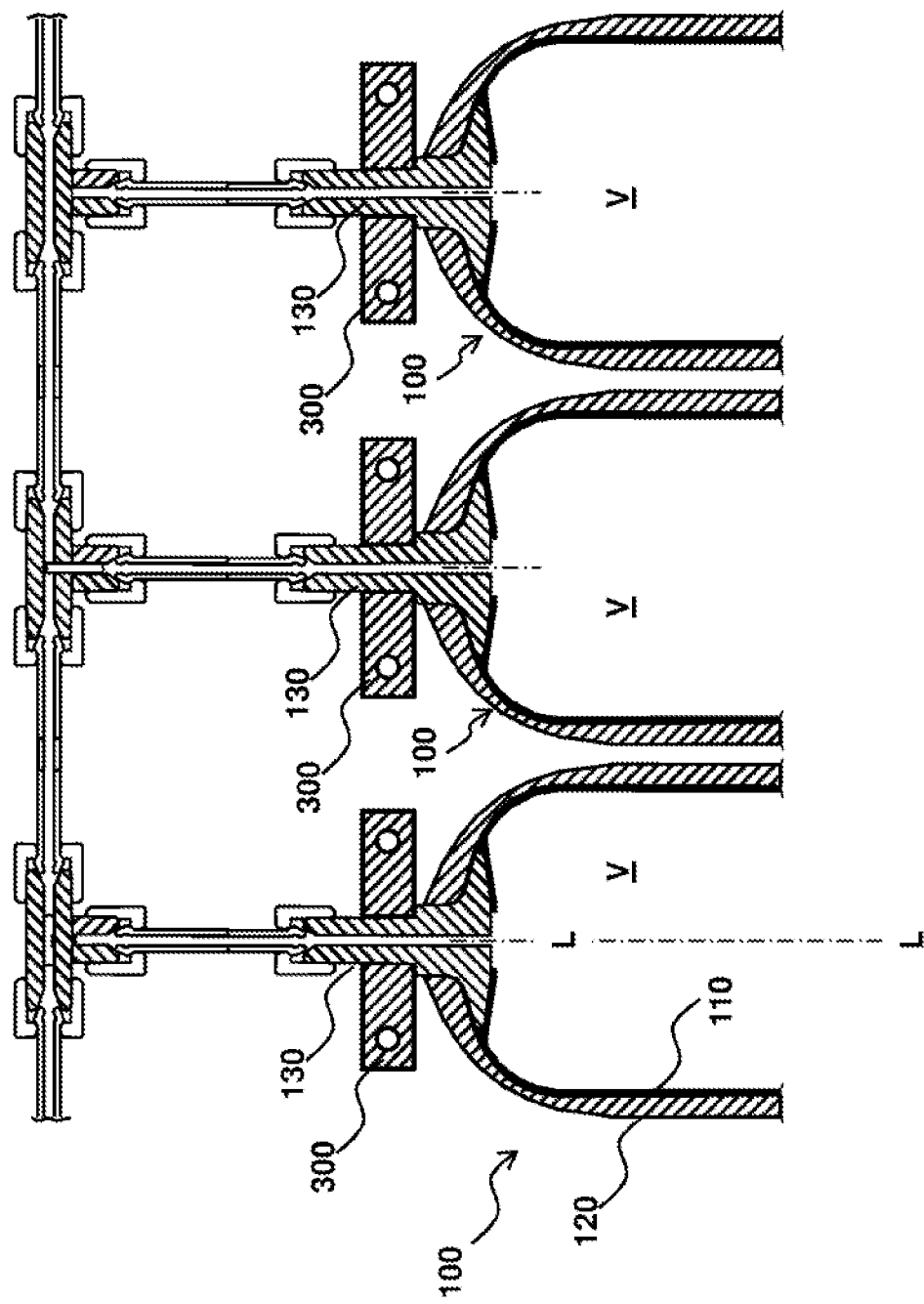
FIG. 1 shows a schematic cross-sectional view of a first design embodiment of the technology disclosed herein.

FIG. 1 shows a schematic cross-sectional view of a first design embodiment of the technology disclosed herein. Shown here are three pressure vessels 100 which have in each case one connector 130. It is likewise contemplated that further pressure vessels 100 conjointly form the pressure vessel system. The connectors 130 here are integrally embedded in the pressure vessel walls. The pressure vessel wall of the pressure vessels 100 here is in each case formed by a liner 110 and a fiber-reinforced layer 120. The connector piece 130 here comprises a fuel duct which runs coaxially and opens into a region in the shape of a truncated cone, or in the shape of a funnel, in the end side of the connector piece 130. The sealing face 132 of the connector piece 130 is provided in this region. The line system which leads to the fuel consumer contacts the respective pressure vessel 100 in this funnel-shaped region. To this end, the line system comprises line connectors which comprise in each case a union nut and line ends that taper toward the end. This line system here forms the fuel-conducting portion. The line system here comprises many individual line elements such as, for example, pipelines, T-connection pieces and union nuts. Furthermore shown here are bodywork attachment elements 300 which here configure in each case one receptacle for the curved fastening faces 134 of the connector piece. The bodywork attachment elements 300 here are separately configured. One common bodywork attachment element 300 for all three pressure vessels 100 could be likewise provided. The fastening face 134 in the contact faces thereof has substantially the same curvature as the internal surface of the (respective) bodywork attachment element 300. The fastening faces 134 that are configured laterally on the external surface of that part of the connector piece that leads out here are in each case pressed against the bodywork attachment elements 300 and fixed as a result. With such a design embodiment, the individual pressure vessels 100 can be rotated to the correct position during assembling, still prior to being fastened. The fluidic connection via the sealing face 132 here is thus advantageously functionally separated from the bodywork attachment via the fastening face 134, such that the forces and moments for mounting the pressure vessels are not transmitted by way of the line system.

Figure 2:
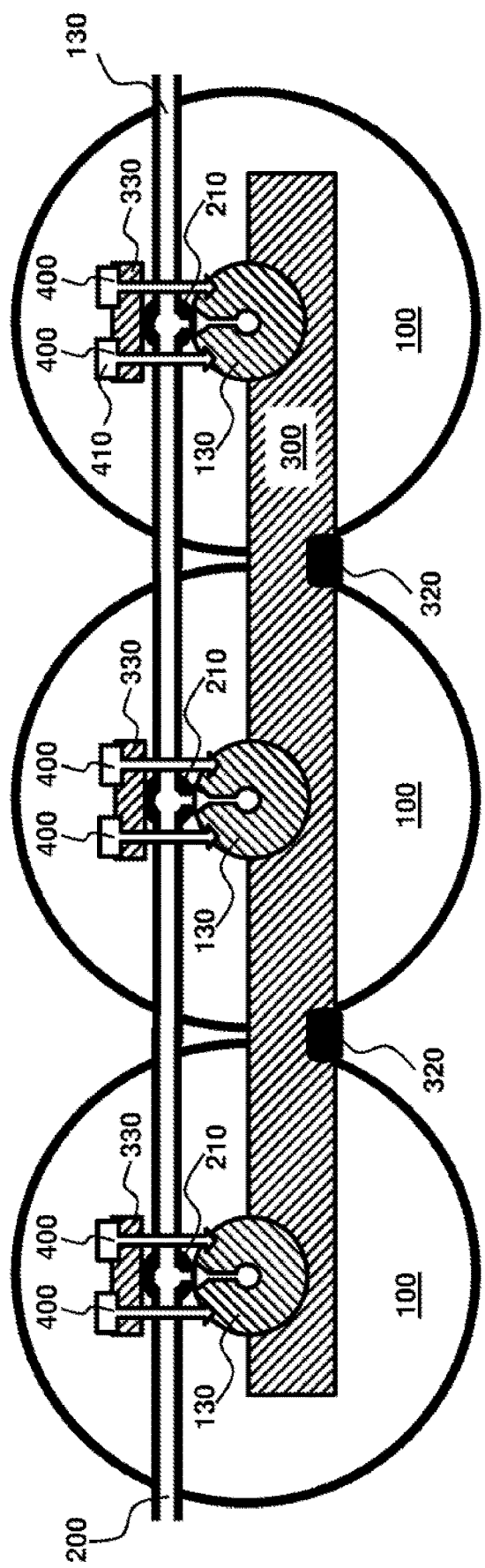
FIG. 2 shows a schematic view of a further design embodiment of the technology disclosed herein.

FIG. 2 is a schematic cross-sectional view of an exemplary embodiment having a plurality of pressure vessels 100. The pressure vessels 100 here are provided so as to be axially parallel in a plane in the underfloor region of the motor vehicle. The fuel-conducting portion 200 here is configured as a fuel rail 200. The fuel rail 200 is produced from a pipe (i.e. fuel line) which has thickened and substantially spherical rail connectors 210. The fluidic connection to the individual connector pieces 130 of the pressure vessels 100 is in each case established by way of these rail connectors 210. The rail connectors 210 are configured so as to be integral to the line pipe. The rail connectors 210 are moreover produced from the same material as the line pipe, e.g. stainless steel. The substantially spherical external surfaces of the rail connectors 210 bear in a sealing manner in the sealing faces 132, here conically configured, of the respective connector pieces 130. In order for the seal seat to be configured, the spherical external surface of the rail connector 210 is pressed onto the sealing face 132. Provided to this end opposite the seal seat is in each case one contact pressure plate 330 which here by means of two tensioning means 400 (e.g. screws) is in each case braced by way of the respective connector piece 130 of the respective pressure vessel 100. During assembling, the individual pressure vessels 100 are aligned as a result of the contact between the sealing faces 132 and the rail connectors 210, even before the pressure vessels 100 are mechanically fastened to the bodywork attachment element 300. The bodywork attachment element 300 furthermore comprises two rubber mounts 320 which can be of the design as is known for mounting internal combustion engines in the engine bay.

In this design embodiment, the fuel rail 200 is configured so as to be substantially straight and does not comprise any bent sub-regions for compensating tolerances. Not shown in more detail here is the fastening of the connector pieces 130 to the common bodywork attachment element 300, and the further integration of the pressure vessels 100 in the motor vehicle. To this end, floor panels and floor plates could be provided below the pressure vessels in the installed position, the floor panels and floor plates potentially being a component part of a common housing of the pressure vessel system. Furthermore not shown are further components such as, for example, pipe rupture safety devices or thermally activatable pressure relief valves.

Figure 3:
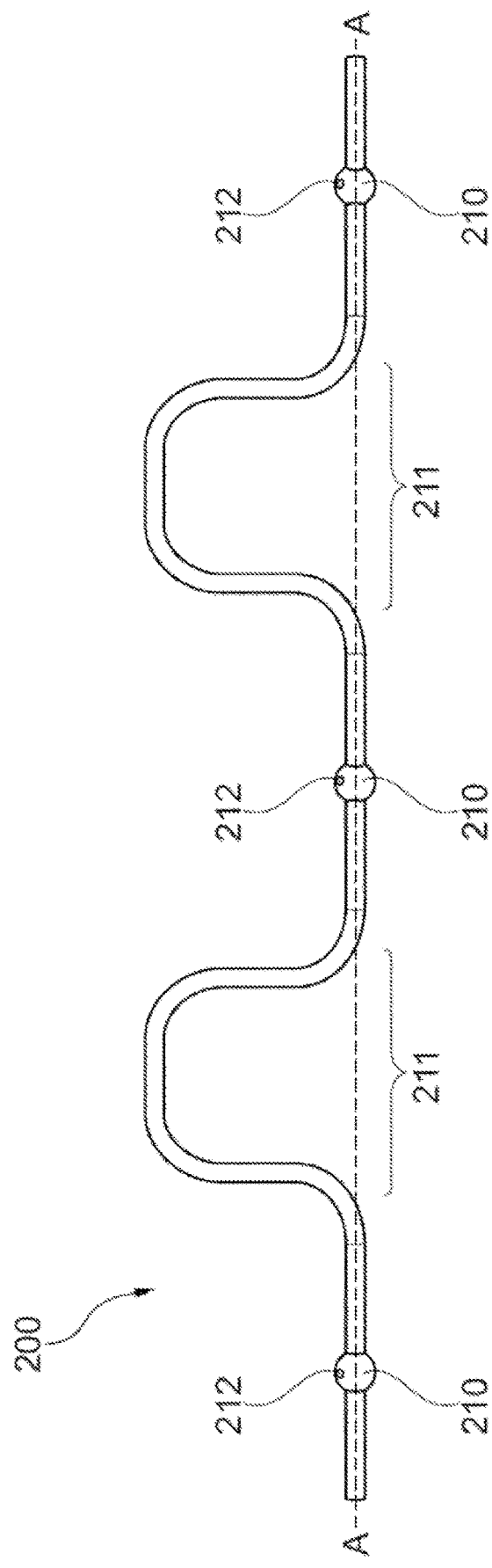
FIG. 3 shows a schematic view of a fuel rail 200 according to the technology disclosed herein.

FIG. 3 shows a schematic view of a fuel rail 200. The rail connectors 210 by way of the rail connector connection holes 212 thereof configure a common axis A-A. The regions of the fuel rail 200 that lie on the common axis A-A run so as to be substantially straight. Bent sub-regions 211 are in each case provided between two rail connectors 210. The bent sub-regions 211 of the fuel rail 200 are regions in which the fuel line, from which the fuel rail 200 is produced, has been bent. The bent sub-regions 211 do not lie on the common axis A-A but run at a spacing from the axis A-A. The bent sub-regions 211 may be of different configurations. In the design embodiment illustrated here, the bent sub-regions 211 are designed such that the fuel rail 200 overall has a meandering profile, or a meandering shape. The bent sub-regions can however also be of another design, e.g. zigzag-shaped. The bent sub-region is designed such that the fuel rail 200 can better compensate positional variations, or tolerances, in the direction of the axis A-A. To this end, the bent sub-regions have portions which run at an angle, and preferably perpendicularly, to the axis A-A. It can be achieved as a result that these portions for compensating tolerances are stressed more heavily in terms of bending than tension. The fuel rail 200 shown here, having the bent sub-regions 211 thereof, can likewise be used in the design embodiments according to the other figures in which a fuel rail 200 without bent sub-regions is shown.

Figure 4:
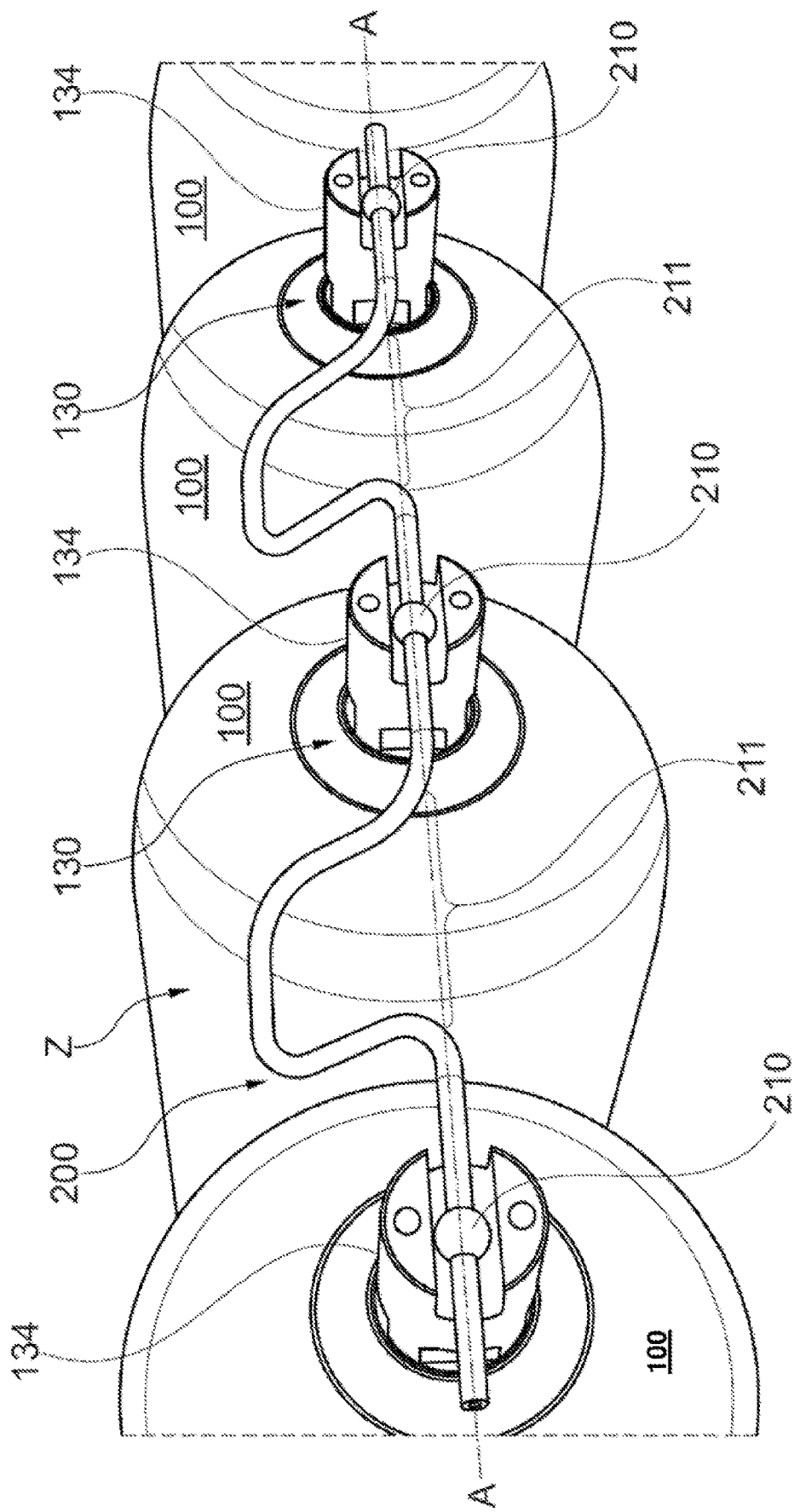
FIG. 4 shows a schematic view of the positioned fuel rail 200 according to FIG. 3.

FIG. 4 shows a schematic view of an exemplary embodiment having a fuel rail 200 according to FIG. 3. The fuel rail 200 is inserted into the connectors 130. The spherical external surfaces of the rail connectors 210 bear on the sealing regions 132 of the connectors 130. Provided in the end sides of the connectors 130 are recesses which in the cross section are U-shaped and in which the corresponding rail connectors 210 here are completely received. The recesses are configured so large that there is sufficient space within the recess on both sides of the fuel rail 200 so as to enable a certain angular offset for the rotation about the pressure vessel longitudinal axis L-L. Two threads for receiving the tensioning means 400 (cf. FIG. 5) are provided in the end side here. The recess here is designed as a duct which in the view from above runs straight and is provided in the circular end face of the connector piece 130. In this way, the recess subdivides the end face into two circular segments, or two circular portions, in which bores for the tensioning means 400 (not shown) are provided here. The bent sub-regions 211 here are provided between, or slightly above, the connectors 130 and so as to be directly adjacent to the pole caps of the pressure vessels 100. A particularly space-saving construction can be implemented in this way. The fastening faces 134 are provided on the circumferential face of the external circumferential face of the respective connector piece 130. In order for the bodywork to be attached, this circumferential face is encompassed and fixedly clamped in one preferred design embodiment.

Figure 5:
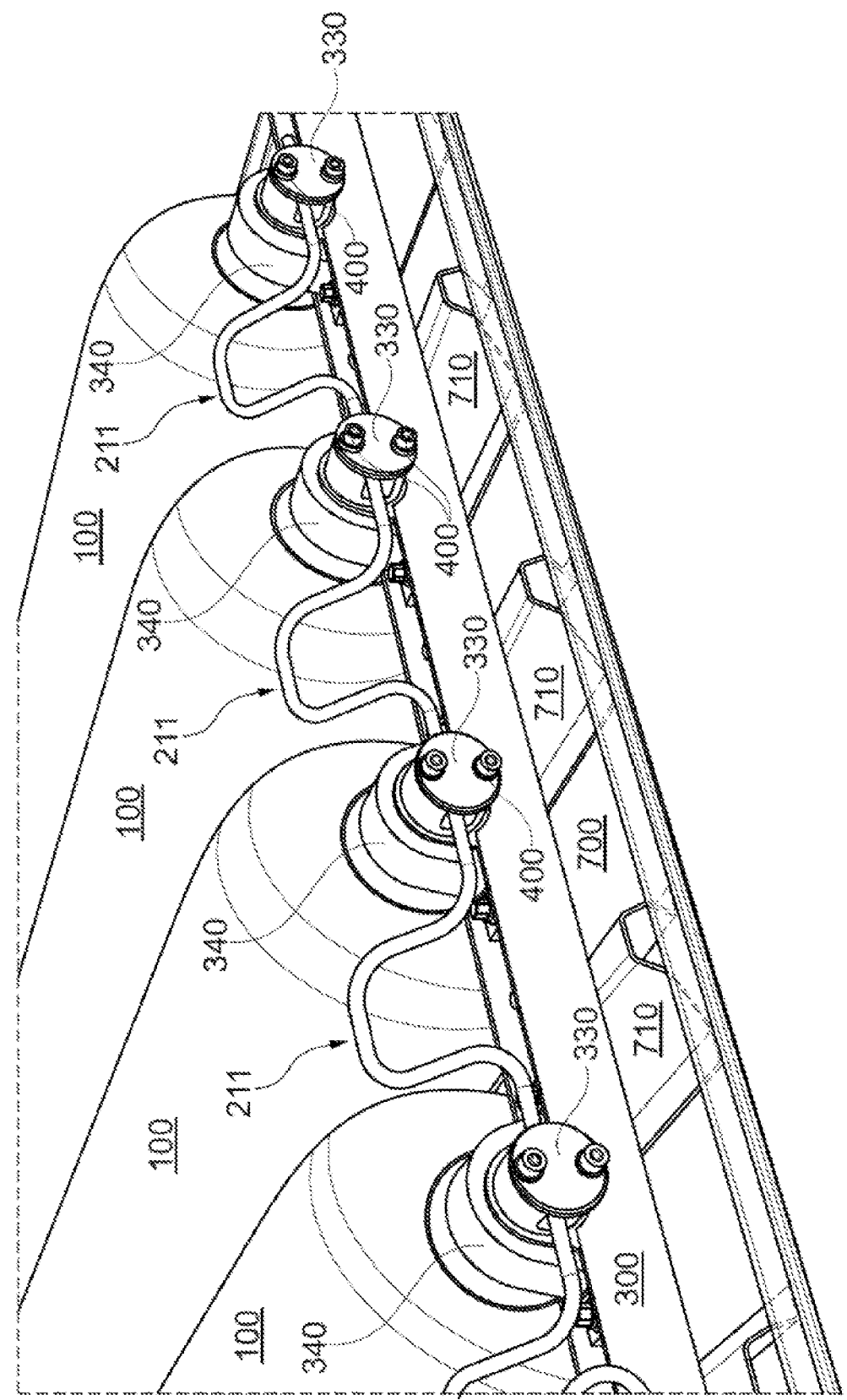
FIG. 5 shows a schematic view of the assembled fuel rail 200 according to FIG. 3 with the bodywork attachment.

FIG. 5 shows a schematic view of the exemplary embodiment according to FIG. 4 in the installed position. The bodywork attachment element 300 here is a member which can have a substantially U-shaped cross section. For example, the member can be a crossmember or a longitudinal member of a motor vehicle. Here, a plurality of pressure vessels 100 by way of the respective connector pieces 130 are fastened to the bodywork attachment element 300. The clamping brackets 340 encompass the fastening faces 134 of the connector pieces 130. The clamping brackets 340 here are configured so as to be substantially a-shaped and are in each case fastened to the bodywork attachment element 300 by screws. Bodywork attachment elements 300, which may be of different designs, are preferably provided on both ends of the pressure vessels 100. The mechanical loads which arise in the operation can be transmitted from the pressure vessels to the vehicle bodywork by way of this/these bodywork attachment(s) 300. The fuel rail 200 in the regions of the rail connectors 210 is pressed onto the sealing faces 132 by the contact pressure plates 330. To this end, the contact pressure plates 330 are axially pretensioned in the direction of the pressure vessel longitudinal axis L-L (cf. FIG. 1) by tensioning means 400. In this way, the mechanical bodywork attachment as well as the fluidic connection can advantageously be implemented in a minor installation space. The assembling is moreover simple and time saving. Potential rotational positioning tolerances of the pressure vessels 100 are moreover less critical.

Furthermore shown is a floor plate 700. Fastening elements 710 project from the floor plate 700. These fastening elements 710 simultaneously serve for stabilizing the floor plate 700. Not shown are further elements of the pressure vessel system such as, for example, pipe rupture safety devices, thermal pressure relief installations, etc.

Figure 6:
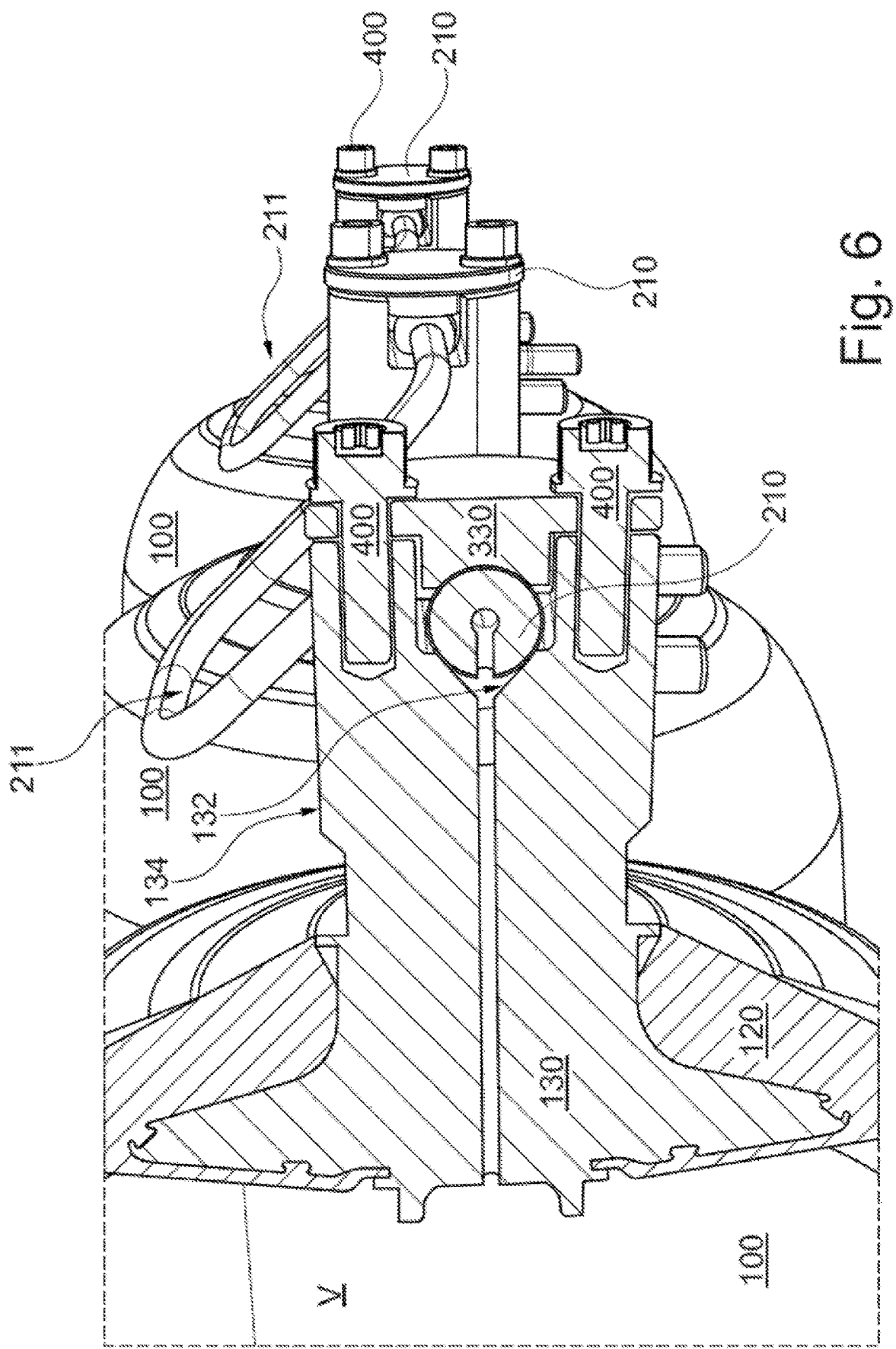
FIG. 6 shows a schematic cross-sectional view of the exemplary embodiment according to FIG. 5.

FIG. 6 shows a schematic cross-sectional view through a pressure vessel 100 and through the fuel rail 200. The connector piece 130 is again configured here so as to be integral to the pressure vessel 100 and is partially surrounded by the fiber-reinforced layer 120 of the pressure vessel wall. The recess, which has a U-shaped cross-sectional geometry, is provided in the end side here. A central bore which connects the fuel storage volume V to the conical opening in the recess opens into this recess. The external circumferential face of the connector piece 130 has a circumferential face which represents the fastening face 134. In the assembled state, this fastening face 134 is encompassed by the clamping bracket 340. The contact pressure plate 330 protrudes into the recess of the connector piece 130 and contacts the rail connector 210. The contact pressure plate 330 in the contact region has a surface shape which corresponds to the external surface of the rail connector 210.

Figure 7:
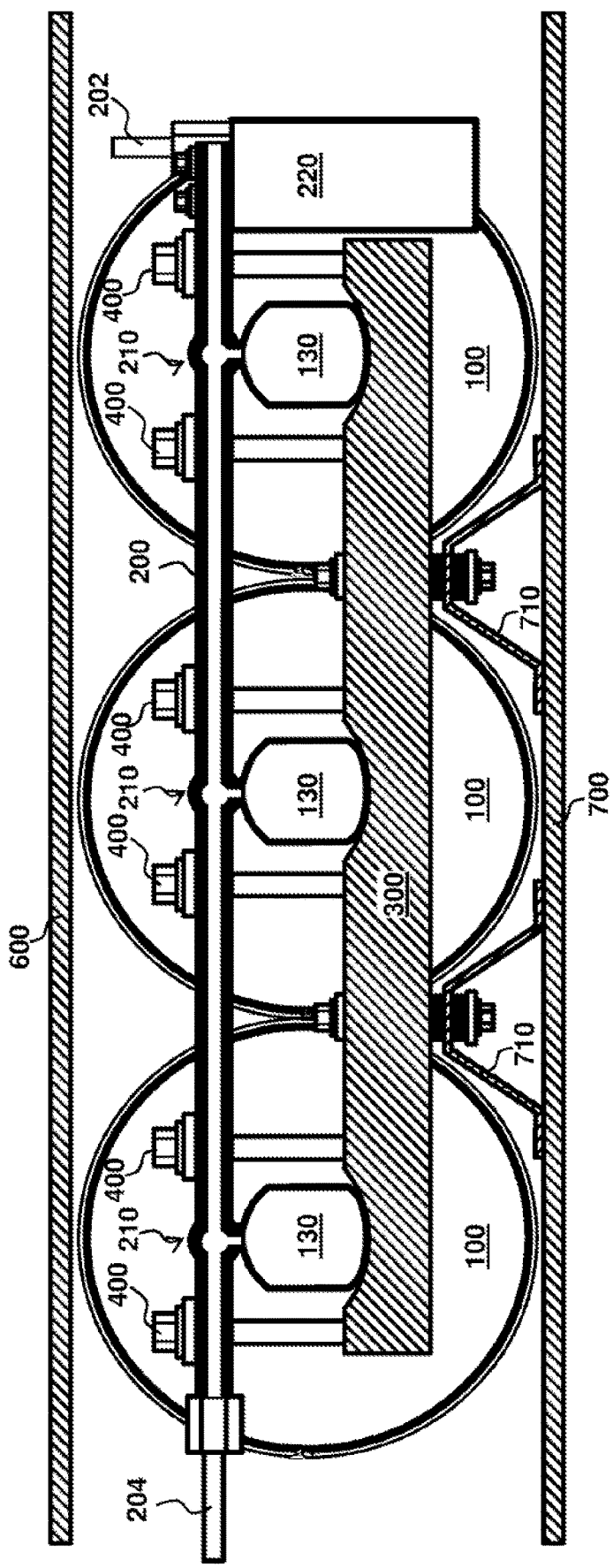
FIG. 7 shows a schematic cross-sectional view of a further design embodiment of the technology disclosed herein.

FIG. 7 shows a schematic cross-sectional view of a further exemplary embodiment. The fuel rail 200 here comprises three rail connectors 210 by way of which three pressure vessels 100 are fluidically connected to one another without interruption. Not shown are potential further components such as, for example, a pipe rupture safety device or a thermally activatable pressure relief valve. The sealing faces 132 of the connector pieces 130 are aligned and simultaneously pushed downward by the rail connectors 210. The bodywork attachment element 300, in particular the internal surfaces thereof, applies/apply the counterforces. As a result, the connector pieces 130 are held in their position. Fastening elements 710 project from the floor plate 700. These fastening elements 710 simultaneously serve for stabilizing the floor plate 700. The valve unit 220 here is fastened directly to the fuel rail 200 so as to be lateral on the fuel rail 200. A normally closed valve which suppresses the supply of fuel to the downstream components of the fuel supply system (e.g. the components of an anode subsystem of a fuel cell system) is provided in the valve unit 220. A pressure regulator which lowers the pressure to a medium pressure range (typically to a value between 5 bar and 50 bar) is typically provided adjacent to the valve unit 220 or in the valve unit 220. A retrieval line connector 202, which can be connected to the retrieval line (not shown), for example, leads out of the valve unit 220 here. Provided at the other end of the fuel rail here is a fueling line connector 204 which can be connected to a fueling line. Instead of lines that lead to further components, further fuel rails or other elements could also be directly coupled at this location.

Figure 8:
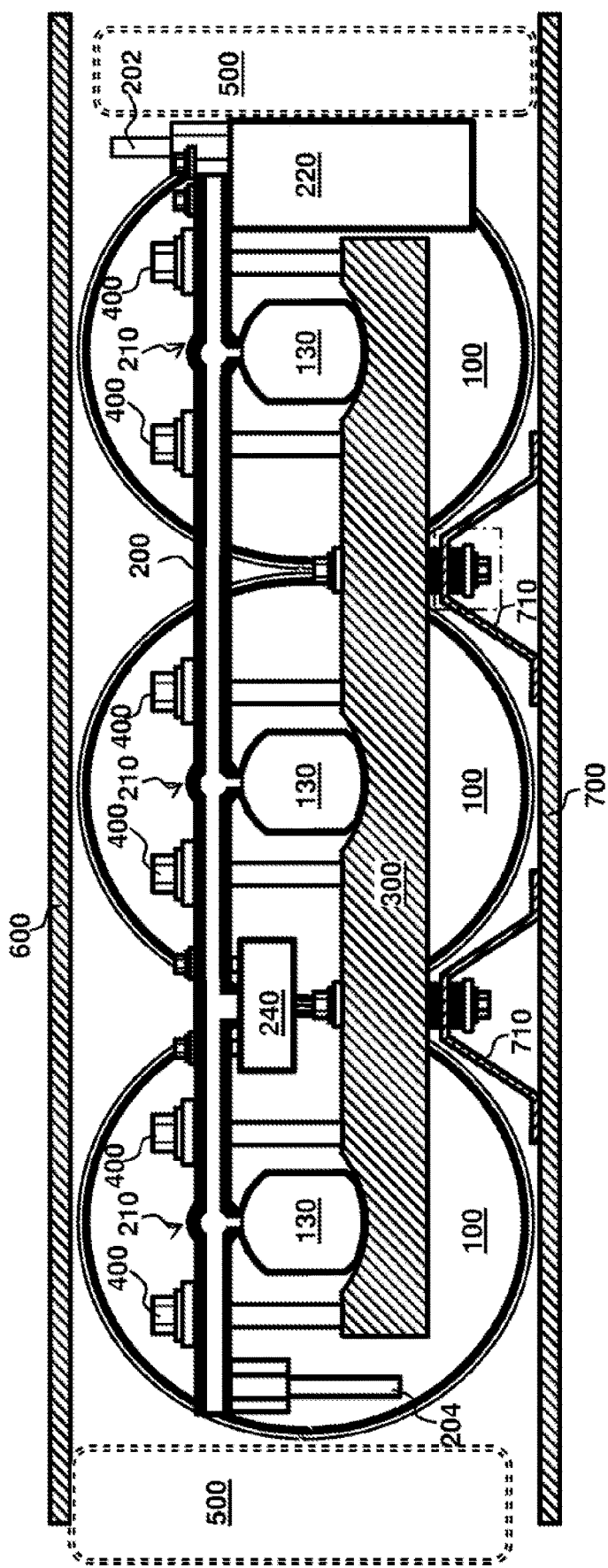
FIG. 8 shows a schematic cross-sectional view of a further design embodiment of the technology disclosed herein.

FIG. 8 shows a schematic cross-sectional view of a further exemplary embodiment. Only the most important points of differentiation in comparison to the preceding exemplary embodiments will be explained in more detail hereunder. Reference otherwise is made to the explanations pertaining to the other figures. The fuel rail 200, additionally to the rail connectors 210 for the pressure vessels 100 and the connectors for the valve unit 220, or the line connectors 202, 204, comprises a further pressure relief connector 242 for connecting the thermally activatable pressure relief installation 240. Should a thermal event arise, the pressure relief installation 240 is triggered and a relief of pressure of all three pressure vessels 100 takes place. It can preferably be provided that a pipe rupture safety device which suppresses the fluidic connection to the contiguous components of the fuel supply system of the motor vehicle should (i) damage to the pressure vessels 100 and/or to the fuel rail 200 occur, and/or (ii) should the pressure relief installation 240 be activated, is provided at the ends of the fuel rail 200, in particular on or in the line connectors 202, 204 and/or in the valve unit 220. In one preferred design embodiment, thermally activatable pressure relief installations 240 are also provided on the ends that face away from the connector pieces 130. Shown schematically here are the members 500 which subdivide the individual underfloor installation spaces. The left member 500 here extends downward from the floor 600 of the motor vehicle. In order for this to be overcome, the fueling line connector 204 here is provided so as to be oriented downward. In this way, a fueling line here can be installed below the member 500. In contrast, it is assumed that on the right periphery the member 500 extends upward away from the floor plate 700. On the right periphery the fuel line can be installed across the member 500. The specific disposal of the lines can be correspondingly adapted to the installation situation.

Figure 9:
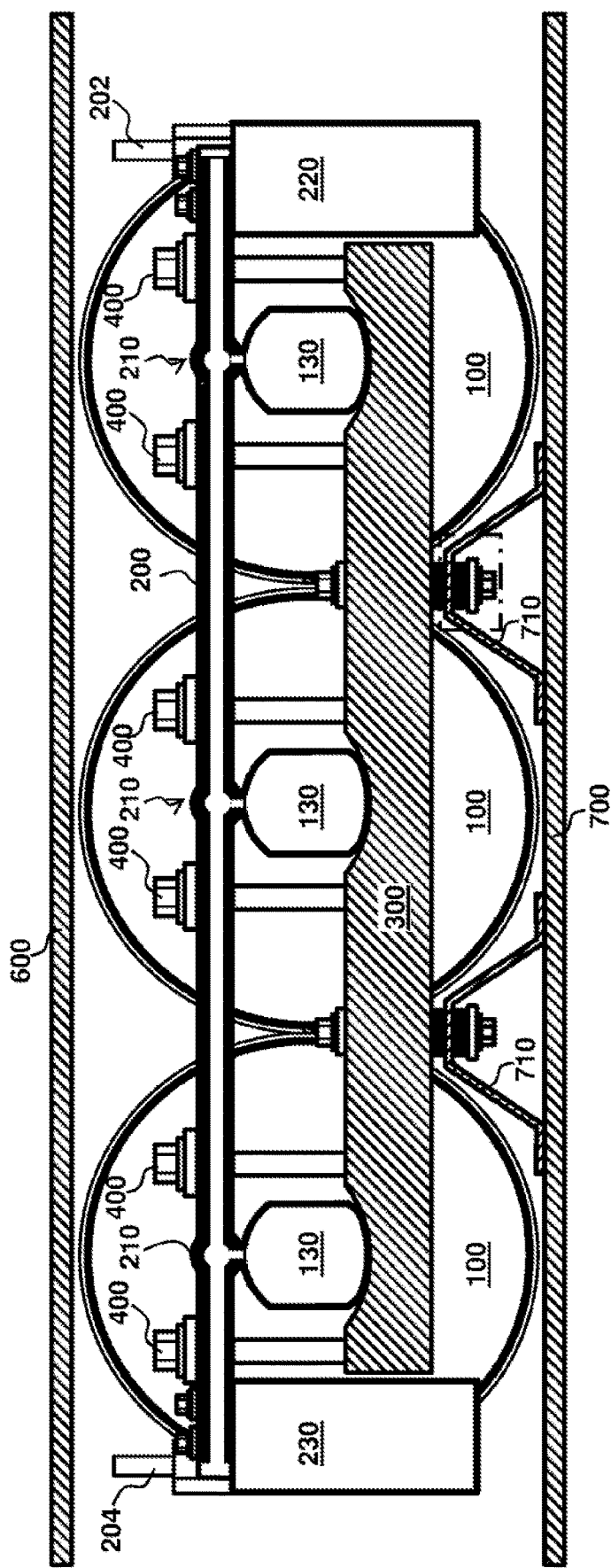
FIG. 9 shows a schematic cross-sectional view of a further design embodiment of the technology disclosed herein.

FIG. 9 shows a schematic cross-sectional view of a further exemplary embodiment. Only the most important points of differentiation in comparison to the preceding exemplary embodiments will be explained in more detail hereunder, and reference otherwise is made to the explanations pertaining to the other figures. The fuel rail 200 additionally comprises a further valve unit 230 which can be provided at the other end of the fuel rail 200. For example, a check valve which suppresses the return flow of fuel into the upstream region of the fueling path can be provided in this valve unit 230. The thermally activatable pressure relief installation 240 (not shown) could also be provided on this unit.

Figure 10:
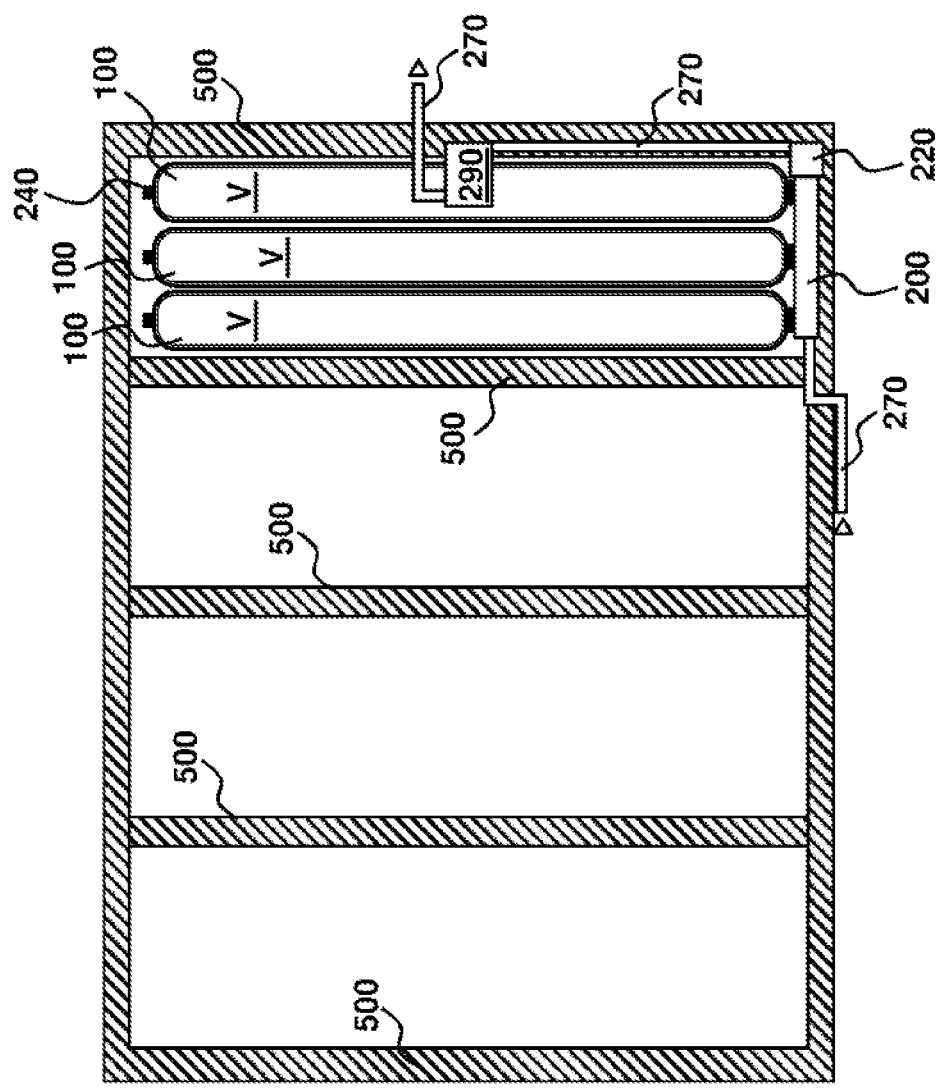
FIG. 10 shows a schematic view of an underfloor region of a motor vehicle, according to a further embodiment.

FIG. 10 shows a view from above onto an underfloor region of a motor vehicle. The members 500 subdivide the underfloor region into different underfloor installation regions. The underfloor installation regions here are substantially of identical size. The individual members 500 in the vehicle transverse direction here extend from one rocker panel to the other rocker panel and contribute substantially toward the stiffness of the bodywork structure. A pressure vessel system is provided here in the right underfloor installation region. The pressure vessel system comprises three pressure vessels 100 which are provided between two members 500. The pressure vessels 100 are disposed so as to be mutually parallel and parallel to the members 500. One end of the pressure vessels 100 is in each case connected to the fuel rail 200 by way of a connector piece 130. Thermally activatable pressure relief installations 240 are in each case provided at the opposite end of the pressure vessels 100. The fuel rail 200 forms the fuel-conducting portion. A fuel line 270, which serves as a fueling line and is connected to the tank coupling (not shown) of the motor vehicle, is connected to one end of the fuel rail 200. The valve unit 220 having the normally closed valve is provided at the other end of the fuel rail 200. The normally closed valve is feedback-controlled, or controlled, by a control apparatus of the motor vehicle. The retrieval of fuel from the pressure vessels is effected by activating the valve. The valve unit 220 is fluidically connected to a pressure regulator 290 by way of a fuel line 270. A further fuel line 270, which leads to the energy converter (not shown) of the motor vehicle, is provided downstream of the pressure regulator 290. Depending on the design embodiment of the motor vehicle, further pressure vessels and further fuel rails 200 which are fluidically connected in series or in parallel to the pressure vessels shown can be provided in the further underfloor installation regions. It is likewise contemplated that high-voltage storage batteries are provided in one or in a plurality of underfloor installation regions. It is also contemplated that the same vehicle architecture is utilized for a motor vehicle without a pressure vessel system, which is driven purely by a battery.

Figure 11:
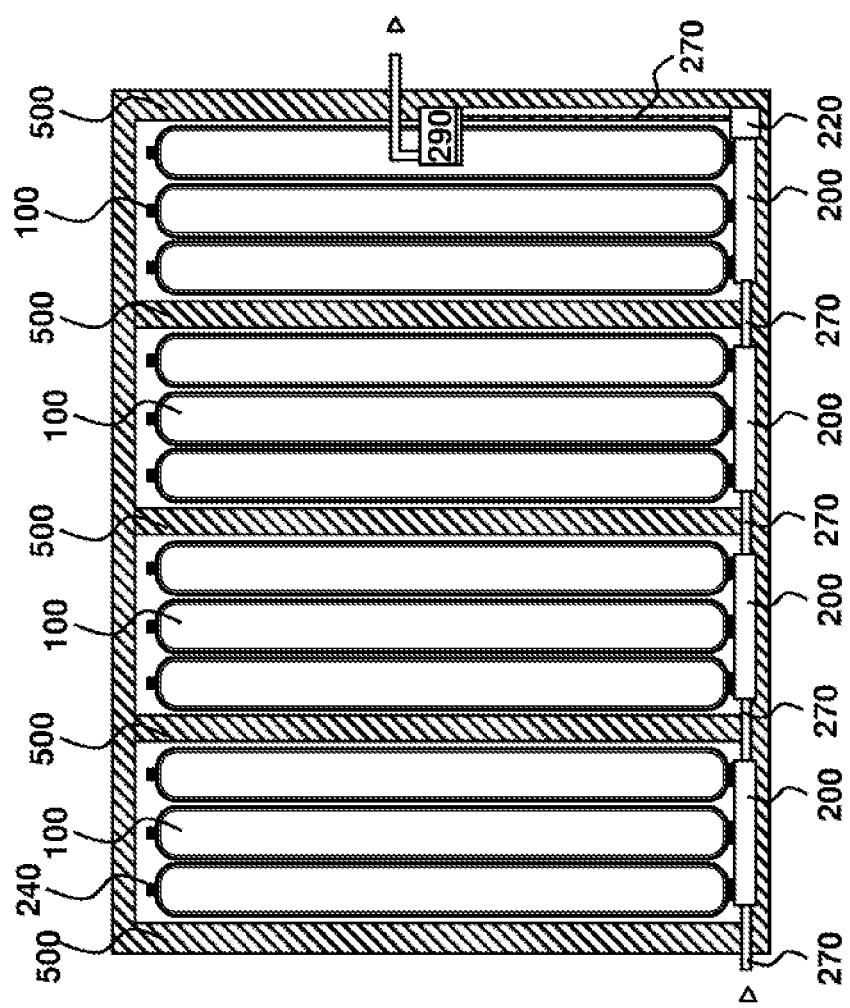
FIG. 11 shows a schematic view of an underfloor region of a motor vehicle, according to a further embodiment.

FIG. 11 shows a further view from above onto an underfloor region of a motor vehicle. In this design embodiment, four fuel rails 200 are provided, wherein one fuel rail 200 with three pressure vessels 100 is in each case disposed in one underfloor region. The fuel rails 200 here are disposed in series and in each case connected to one another by means of fuel lines 270. The fuel lines 270 are guided around the members 500. A valve unit 220, which likewise contains the normally closed valve and shuts off all pressure vessels 100 provided in the underfloor region in relation to the remaining fuel supply installation, is provided between the pressure regulator 290 and the fuel rails 200. Only one fuel rail 200 of the four fuel rails 200 is connected to a fuel line 270 which serves as a fueling line. The two central fuel rails 200 are connected only to adjacent fuel rails 200.

FIG. 12 shows a pressure vessel system having an alternative design embodiment of the contact pressure plate 330 and the tensioning means 400, which is explained in more detail in the context of FIG. 13. The pressure vessel system otherwise is expediently designed such as has been explained in the context of the preceding figures.

FIG. 13 shows a cut-away perspective view of the pressure vessel system according to FIG. 12. The fuel rail 200 here runs in a meandering shape. The portions of the fuel line in which the rail connectors 210 are provided run so as to be mutually parallel. The rail connectors 210 have in each case one rail connector connection hole 212. The rail connector connection hole 212 here forms the fluidic connection between the fuel storage volume V of the pressure vessel 100 and the fluid duct of the fuel line, the latter here being configured as a pipe. The front end 214, which here bears on the sealing face 132 of the connector piece 130, here is curved and preferably configured so as to be substantially spherical. In the assembled state, the front end 214 conjointly with the sealing face 132 forms the sealing element. However, other sealing systems are also conceivable. As in the design embodiment according to FIG. 4, a recess U is provided here, in which the fuel line including the rail connector 210 is disposed. The recess U from the end side of the connector piece 130 extends in the direction of the pressure vessel longitudinal axis inward in the direction of the fuel storage volume V. The recess U is thus configured so as to be depressed in relation to the end side. The recess U here subdivides the end side into two end segments which here are in each case designed as mutually opposite ring segments. In other words, these ring segments are substantially C-shaped protrusions which from the base of the recess U extend outward in the direction of the pressure vessel longitudinal axis. The recess U in a central region has a region which in the view from above onto the end sides is widened and here is configured so as to be circular. An internal thread is provided in the central region on the recess, or on the protrusions formed by the recess U. The contact pressure plate 330 here is inserted into this central region. The contact pressure plate 330 on the periphery has an external thread which engages in the internal thread of the recess, the latter being divided here. The contact pressure plate 330 furthermore comprises a screw head drive (e.g. hexagonal socket, hexalobular socket, internal serration socket, etc.) which is specified to screw the contact pressure plate 330 into the central region of the connector piece 130 so as to in this way press the rail connector 210 against the sealing face 132.

FIG. 14 shows a sectional view through a connector piece 130 along the pressure vessel longitudinal axis. Provided in the connector piece 130 is a fluid duct which here runs so as to be coaxial with the pressure vessel longitudinal axis. The fluid duct in terms of the diameter is widened close to the end side by a bore. Part of the rail connector 210 is received in the connector piece 130 in this region. Because a different sealing concept has been implemented here, the front end of the rail connector 210 here is not configured so as to be substantially in the shape of a spherical segment, but flat. Provided instead is an O-ring between the wall of the fluid duct and the cylindrical external wall portion of the rail connector 210. A groove for improved fixing is provided in the external wall portion.

In other words, the contact pressure plate 330 is a central compression screw which here is conceived such that the contact pressure plate 330, after joining the line to the spherical connector in the groove-shaped milled feature in the boss, presses onto the sealing location by way of a divided thread. In this way, the space requirement, the weight and/or the screw connection complexity can advantageously be reduced.

The concept having a flexible fuel rail (i.e. the use of a comparatively flexural high-pressure line) with the integrated rail connector (i.e. a "mini T-fitting") can be connected in a very compact manner in the case of the boss which is relatively small at minor pressure vessel diameters. The central screw connection offers many advantages in comparison to other fastenings of the contact pressure plate such as, for example, a simpler screw connection process and a smaller input of material and thus advantages in terms of weight and costs. Furthermore, the contact pressure plate in this example is well protected in relation to mechanical damage in the event of a crash. The materially integral attachment of a branch piece which is asymmetrical in relation to the line axis by means of soldering/brazing is particularly inexpensive. Soldering/brazing advantageously tends to have a sealing function rather than a tensile force transmitting function. Compressive forces of the fixing screw can expediently be guided about the line by way of the branch piece. The line under pressure comes to bear on the branch piece from the inside, and the soldered/brazed seam is substantially pressed against this collar-type part.

The term "substantially" (e.g. "substantially flexurally rigid") in the context of the technology disclosed herein comprises in each case the exact property, or the exact value (e.g. "flexurally rigid") and in each case deviations which are irrelevant for the functioning of the property/of the value (e.g. "tolerable deviation from flexurally rigid").

The preceding description of the present invention serves only illustrative purposes and is not intended to limit the invention. Various variants and modifications are possible within the scope of the invention without departing from the scope of the invention and the equivalents thereof. For example, instead of three pressure vessels (cf. FIG. 12), an arbitrary number of pressure vessels 100 can be connected to one fuel rail 200. Also, instead of one fuel rail 200, or four fuel rails 200, any other number of fuel rails 200 may also be provided. In one design embodiment, a fuel line 200 can extend across the entire underfloor region. Fuel lines 270 can advantageously also be configured separately from a fuel rail 200, for example in that the fuel rail 200 is guided about a member 500. The pressure vessel system disclosed herein can be equipped with the fuel rail 200 disclosed herein or with any other fuel rail.

LIST OF REFERENCE SIGNS

100 Pressure vessel
110 Liner
120 Fiber-reinforced layer
130 Connector piece
132 Sealing face
134 Fastening face
200 Fuel-conducting portion
202 Retrieval line connector
204 Fueling line connector
210 Rail connector
211 Bent sub-regions 211
212 Rail connector connection holes
214 Front end
220, 230 Valve unit
240 Thermally activatable pressure relief installation
242 Pressure relief connector
250 Pipe rupture safety valve
270 Fuel line
290 Pressure regulator
300 Bodywork attachment element
320 Rubber mount
330 Contact pressure plate
340 Clamping bracket
400 Tensioning means
410 Tensioning element
500 Member
600 Floor
700 Floor plate
710 Fastening element
L-L Pressure vessel longitudinal axis
A-A Axis
U Recess
V Fuel storage volume
Z Intermediate region

The invention claimed is:

1. A fuel rail for a pressure vessel system having a plurality of pressure vessels for storing fuel, comprising:
   a fuel line;
   bent sub-regions of the fuel line; and
   a plurality of rail connectors, wherein
   the rail connectors have cross-sectional areas that are enlarged in comparison to the fuel line,
   the rail connectors are configured so as to be integral to the fuel line,
   at least one rail connector of the plurality of rail connectors is configured so as to be spaced apart from ends of the fuel line,
   the bent sub-regions are in each case provided between two rail connectors, and
   the bent sub-regions in an installed position thereof are provided to compensate variations in positions of the plurality of pressure vessels;
   wherein each front end of the rail connectors is configured so as to be substantially in a shape of a spherical segment.

2. The fuel rail according to claim 1, wherein
   the plurality of rail connectors are disposed on a common axis and define the common axis, and
   the bent sub-regions at least partially extend so as to be spaced apart from the common axis.

3. The fuel rail according to claim 2, wherein
   the bent sub-regions in the installed position thereof are provided to compensate by elastic deformation potential positional variations of the plurality of pressure vessels.

4. The fuel rail according to claim 1, wherein
   the bent sub-regions are, at least in regions, configured in a meandering or zig-zagging shape.

5. The fuel rail according to claim 1, wherein
the rail connector has a rail connector connection hole which opens into the fuel line so as to be at an angle to a longitudinal axis of the fuel line.

6. The fuel rail according to claim 1, wherein
each rail connector is configured for connection to a pressure vessel of the plurality of pressure vessels at a location along a central axis thereof.

7. A pressure vessel for storing fuel, comprising:
a connector piece for configuring a fluidic connection between a fuel storage volume of the pressure vessel and an energy converter of a motor vehicle, wherein
the connector piece is at least partially routed out of the pressure vessel,
an external surface of the connector piece has a sealing face and a curved fastening face,
the sealing face is provided to seal the fluidic connection between the pressure vessel and a fuel rail, and
the fastening face is provided for fastening the pressure vessel to at least one bodywork attachment element, wherein
the fuel rail comprises:
a fuel line;
bent sub-regions of the fuel line; and
a plurality of rail connectors, wherein
the rail connectors have cross-sectional areas that are enlarged in comparison to the fuel line,
the rail connectors are configured so as to be integral to the fuel line,
at least one rail connector of the plurality of rail connectors is configured so as to be spaced apart from ends of the fuel line,
the bent sub-regions are in each case provided between two rail connectors, and
the bent sub-regions in an installed position thereof are provided to compensate variations in positions of the pressure vessel,
wherein the fastening face and the sealing face are provided laterally on that part of the connector piece that is routed out of the pressure vessel, and the fastening face and the sealing face are disposed opposite one another.

8. The pressure vessel according to claim 7, wherein
the fastening face is provided laterally on that part of the connector piece that leads out of the pressure vessel, and
the sealing face is provided in an end side of that part of the connector piece that leads out of the pressure vessel.

9. The pressure vessel according to claim 7, wherein
the sealing face is configured as a truncated cone face that tapers into the connector piece; and/or
the fastening face is configured by a surface portion of a spherical segment or of a cylinder.

10. The pressure vessel according to claim 7, wherein
the connector piece has a recess which is depressed in relation to an end face of the connector piece, and
the recess is provided to at least partially receive the fuel rail.

11. The pressure vessel according to claim 7, wherein
the connector piece has an internal thread, an external thread of a contact pressure plate engaging in the internal thread in order for a respective rail connector to be braced.

12. The pressure vessel for storing fuel according to claim 7, wherein
a front end of the rail connector is configured so as to be substantially in a shape of a spherical segment.

13. The pressure vessel for storing fuel according to claim 7, wherein
the connector piece is position along a central axis of the pressure vessel; and,
the rail connector is configured for connection to the pressure vessel via the connector piece.

14. A pressure vessel system, comprising:
a connector piece for configuring a fluidic connection between a fuel storage volume of the pressure vessel and an energy converter of a motor vehicle, wherein
the connector piece is at least partially routed out of the pressure vessel,
an external surface of the connector piece has a sealing face and a curved fastening face,
the sealing face is provided to seal the fluidic connection between the pressure vessel and a fuel rail, and
the fastening face is provided for fastening the pressure vessel to at least one bodywork attachment element, wherein
the fuel rail comprises:
a fuel line;
bent sub-regions of the fuel line; and
a plurality of rail connectors, wherein
the rail connectors have cross-sectional areas that are enlarged in comparison to the fuel line,
the rail connectors are configured so as to be integral to the fuel line,
at least one rail connector of the plurality of rail connectors is configured so as to be spaced apart from ends of the fuel line,
the bent sub-regions are in each case provided between two rail connectors, and
the bent sub-regions in an installed position thereof are provided to compensate variations in positions of the pressure vessel,
wherein the bodywork attachment element has a curved internal surface, a curvature of which, for configuring a contact face, corresponds substantially to a curvature of an external surface of the curved fastening face.

15. The pressure vessel system according to claim 14, wherein
at least one valve unit is connected to the fuel rail, the at least one valve unit comprising a normally closed valve, and
wherein no normally closed valves are provided between the fuel storage volume of the pressure vessels and the rail connectors.

16. The pressure vessel system according to claim 14, wherein
a front end of the rail connector is configured so as to be substantially in a shape of a spherical segment.

17. The pressure vessel system according to claim 14, wherein
the connector piece is position along a central axis of the pressure vessel; and,
the rail connector is connected to the pressure vessel via the connector piece.

18. The pressure vessel system according to claim 14, wherein
when the pressure vessel and the connector piece are in an installed position connected to the rail connector, the connector piece is at least partially rotatable relative to the rail connector.

19. A motor vehicle, comprising:
a bodywork of the motor vehicle; and
at least one pressure vessel system according to claim 14.

* * * * *